June 8, 1954
E. A. FIELD
2,680,564
BAROMETRIC DRAFT REGULATOR
Original Filed July 21, 1951
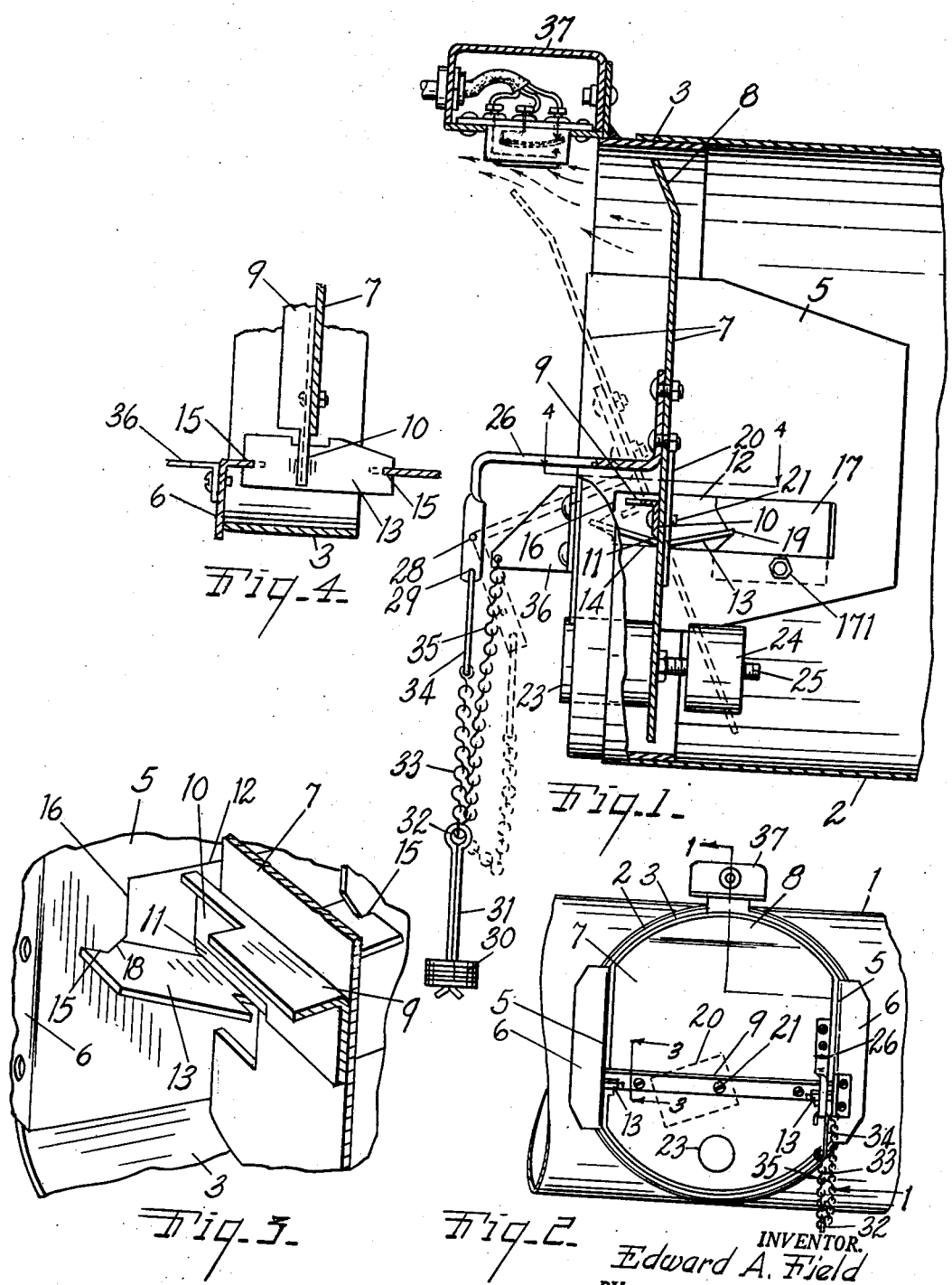
INVENTOR.
Edward A. Field
BY
*[signature]*
ATTORNEY.

Patented June 8, 1954

2,680,564

UNITED STATES PATENT OFFICE 2,680,564

BAROMETRIC DRAFT REGULATOR

Edward A. Field, Mendota, Ill.

Original application July 21, 1951, Serial No. 237,855. Divided and this application October 6, 1952, Serial No. 313,347

6 Claims. (Cl. 236—45)

This invention relates to improvements in a barometric draft regulator.

My present application is a division of my application for Letters Patent, filed July 21, 1951, Serial Number 237,855.

The main objects of this invention are:

First, to provide a barometric draft regulator which is effective in controlling updraft and also constituting venting means for a downdraft or back draft.

Second, to provide in a barometric draft regulator an improved gate mounting and regulating means.

Third, to provide a structure having these features and advantages which is adapted for use both on horizontal and vertical flues.

Fourth, to provide a draft regulator having these advantages which is very economical in its parts and the assembly thereof, is very durable and it not likely to get out of repair.

Objects relating to details and economies of the invention will appear from the description to follow. The invention is defined and pointed out in the claims.

A preferred embodiment of the invention is illustrated in the accompanying drawing, in which:

Fig. 1 is a fragmentary view of a draft regulator embodying my invention, partially in longitudinal section on a line corresponding to line 1—1 of Fig. 2.

Fig. 2 is a fragmentary front elevational view.

Fig. 3 is a fragmentary perspective view partially in section on a line corresponding to line 3—3 of Fig. 2 illustrating details of the housing structure and of the gate mounting.

Fig. 4 is a fragmentary view in section on a line corresponding to line 4—4 of Fig. 1.

In the embodiment of my invention illustrated, 1 represents a horizontal smoke flue and 2 a gate housing which is mounted to open into the flu, the details of the mounting not being illustrated. The housing includes an annular gate support member 3 which is positioned at the front of the housing and is provided with vertically disposed rearwardly projecting wing-like side plates 5 having outturned flanges 6 at their forward ends. The gate 7 is shaped to swing between the side plates 5 and in the embodiment illustrated has a forwardly projecting segmental flange-like top portion 8.

The pivot member 9 has pivot portions 10 at its ends provided with knife-like pivot edges 11. The side plates 5 have elongated horizontal openings 12 therein through which the pivots project.

V-shaped plate-like bearing members 13 are disposed facing upwardly and supportedly rest on the bottom edges 14 of the openings 12 in the plates 5. The bearing members have notches 15 in their ends, the notches in the front ends of the bearing members receiving the front edges 16 of the openings 12, and the notches in the rear end of the bearing member being engaged by bearing retaining plates 17 which are secured in bearing member engaging position as by bolts 17'. The edges 16 of the bearing receiving slots are notched at 18 while the bearing retaining plates have notches 19 in their bearing member engaging edges. These slots in the bearing member supports are of such transverse dimensions as to permit tilting of the bearing members on the supporting edges 14, thus permitting the bearing members to align with the pivot edges 11 of the pivots 10.

The gate is provided with an adjustable plate-like weight 20 which is mounted on the screw 21 for swinging adjustment in a plane parallel to the plane of the gate. The weight 23 is clamped upon the front side of the gate below the pivot thereof while the weight 24 is adjustably supported on the rear side of the gate but having threaded engagement with the bolt 25, the forward end of which in the embodiment illustrated secures the weight 23 to the gate.

To adjust the gate to the desired draft it is provided with a forwardly projecting arm 26 secured to the gate above the pivot and adjacent one side edge thereof to project forwardly a substantial distance. This arm has a downturned portion with spaced holes 28 and 29 therein. A plurality of washer-like auxiliary weights 30 are provided to permit adjustment of the gate to the desired closing torque or to adjust the gate to the desired draft. These weights 30 are in the embodiment illustrated threaded upon a hanger 31 having an eye 32 therein which is engaged by the suspending chain 33 adjustably connected by the link 34 to the arm 26, the link being selectively engaged with one of the holes 28 and 29.

When the regulator is installed on a horizontal flue, as is illustrated, the link 34 should be engaged with the hole 29. When installed in a vertical flue the links should be engaged with the hole 28. These holes 28 and 29 are spaced to generally compensate for the differences in draft conditions commonly found in horizontal and vertical flues. When the gate swings outwardly as the result of a downdraft, indicated by dotted lines in Fig. 1, the auxiliary weight is supported by the chain 35 connected to the bracket 36 on the housing.

The numeral 37 represents a thermal switch which is in the path of the outflowing gases as is illustrated in Fig. 1 and operatively associated with a burner control valve. Claims to this portion of my invention are, however, in my application 237,855.

I have illustrated and described my invention in a highly practical embodiment thereof. I have no attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. In a barometric draft regulator, an open ended gate housing, a pivotally mounted control gate disposed in said housing for opening inwardly during an updraft and outwardly during an outdraft, said gate being disposed approximately vertical when closed, weighting means on said gate, the center of gravity of the gate and weighting means thereon being disposed vertically below the pivotal axis of the gate to effect a closing torque on the gate, an arm mounted on and projecting outwardly from said gate, said arm having a downwardly projecting outer portion with vertically spaced holes therein, a bracket projecting forwardly from said housing, an auxiliary weight for producing additional closing torque on the gate when the gate opens inwardly due to an updraft, a first weight supporting element connecting said auxiliary weight to said arm and selectively engageable with said holes therein, and a flexible second supporting element connected to said auxiliary weight and to said bracket and of such length as to support the auxiliary weight when the gate opens outwardly due to an outdraft.

2. In a barometric draft regulator, an open ended gate housing, a pivotally mounted control gate disposed in said housing for opening inwardly during an updraft and outwardly during an outdraft, said gate being disposed in an approximately vertical plane when closed, weighting means on said gate disposed to effect a closing torque on the gate, an arm mounted on and projecting outwardly from said gate, a bracket projecting forwardly from said housing, an auxiliary weight for producing additional closing torque on the gate when the gate from said closed position opens inwardly due to an updraft, a first weight supporting element connecting said auxiliary weight to said arm, the connection of said supporting elment to said arm being horizontally spaced from the plane of the gate, and a flexible second supporting element connected to said auxiliary weight and to said bracket and of such length as to support the auxiliary weight when the gate from said closed position opens outwardly due to an outdraft.

3. In a barometric draft regulator and burner control, an open ended gate housing, a pivotally mounted control gate disposed in said housing for opening inwardly during an updraft and outwardly during an outdraft, weighting means on said gate acting to effect a closing torque thereon, an auxiliary weight for producing additional closing torque on the gate when the gate from said closed position opens inwardly due to an updraft, a first weight supporting element connecting said auxiliary weight to said gate, the connection of said supporting element to the gate being horizontally spaced from the plane of the gate, and a flexible second supporting element connected to said auxiliary weight and to said housing and of such length as to support the auxiliary weight when the gate from said closed position opens outwardly due to an outdraft.

4. In a draft regulator, a gate housing provided with vertical parallel inwardly projecting side plates having aligned horizontally elongated openings therein, a control gate disposed in said housing for pivotal swinging movement between said side plates, a pivot member mounted on said gate to project through said openings in said side plates and having knife-like pivot edges, V-shaped bearing members having slotted ends disposed upon the bottom edges of said openings with the slots of the forward ends of the bearing members engaging the forward edge of the openings in said side plates, and bearing retaining plates mounted on said side plates to engage the slots in the rear ends of said bearing members whereby the bearing members are retained and rockably supported.

5. In a draft regulator, a gate housing provided with vertical parallel inwardly projecting side plates having aligned horizontally elongated openings therein, a control gate disposed in said housing for pivotal swinging movement between said side plates, a pivot member mounted on said gate to project through said openings in said side plates, V-shaped bearing members having slotted ends disposed upon the bottom edges of said openings with the slots of the forward ends of the bearing members engaging the forward edge of the openings in said side plates, and bearing retaining plates mounted on said side plates to engage the slots in the rear ends of said bearing members whereby the bearing members are retained and rockably supported.

6. In a draft regulator, a gate housing provided with vertical inwardly projecting bearing supports having aligned openings therein, a control gate disposed for pivotal swinging movement in said housing, a pivot member mounted on said gate to project through said openings in said supports, angled bearing members having slotted ends disposed upon the bottom edges of said openings with the slots of the forward ends of the bearing members engaging the forward edge of the openings in said supports, and bearing retaining members mounted on said supports to engage the slots in the rear ends of said bearing members whereby the bearing members are retained and rockably supported.

No references cited.